Dec. 7, 1965  A. HASBROUCK  3,221,499
INJECTOR HEAD FOR ROCKET
Filed April 12, 1960  3 Sheets-Sheet 1

INVENTOR
AUGUSTUS HASBROUCK
BY Charles A. Warren
ATTORNEY

Dec. 7, 1965    A. HASBROUCK    3,221,499
INJECTOR HEAD FOR ROCKET
Filed April 12, 1960    3 Sheets-Sheet 2

INVENTOR
AUGUSTUS HASBROUCK
BY Charles A. Warren
ATTORNEY

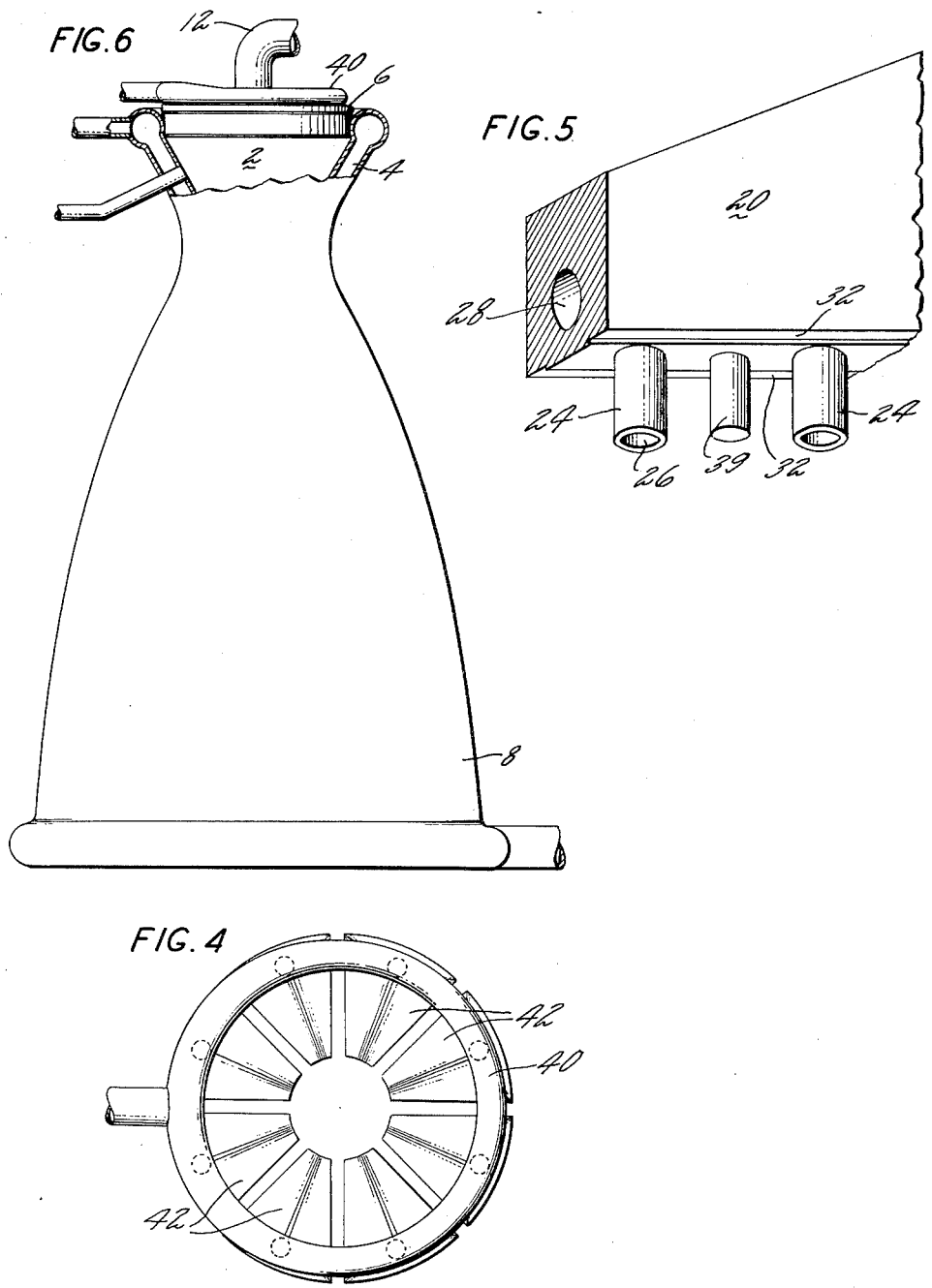

United States Patent Office 3,221,499
Patented Dec. 7, 1965

3,221,499
INJECTOR HEAD FOR ROCKET
Augustus Hasbrouck, Middletown, Conn., assignor to United Aircraft Corporation, East Hartford, Conn., a corporation of Delaware
Filed Apr. 12, 1960, Ser. No. 21,832
14 Claims. (Cl. 60—39.74)

This invention relates to an injector head for a liquid fuel rocket.

One problem in rockets of this type is to provide for adequate flow of the propellants in the proper proportion and in the effective mixing of the propellants and at the same time to make the injector head strong enough to withstand the pressures thereon. One feature of the invention is an injector head that will solve this problem in a comparatively simple arrangement. Another feature is an injector head having these desired characteristics and in which there is no possibility of leakage between the propellant manifolds.

One feature of the invention is an injector head having a high-strength structural member having radially extending manifolds and forming the oxidizer injector structure with an annular fuel manifold for delivering fuel between the radially extending manifolds. Another feature is an incorporation of a plurality of annular oxidizer manifolds interconnecting the radial manifolds with the annular manifolds spaced apart radially for a flow of fuel therebetween. In each arrangement a flow of fuel is provided concentrically around each of a plurality of oxidizer openings into the combustion chamber.

More specifically, one feature of the invention is an injector head having a hub with radially extending hollow spokes forming a manifold for one propellant with the injector tubes projecting axially therefrom and having a cooperating manifold for the other propellant so arranged as to provide for the delivery of the other propellant concentrically around each of the tubes. Another feature is the incorporation of a number of concentric rings radially spaced apart and having passages therein communicating therewith the hollow spokes and carrying additional injector tubes, the other propellant passing between the adjacent rings in reaching the desired openings.

Other features and advantages will be apparent from the specification and claims, and from the accompanying drawings which illustrate an embodiment of the invention.

FIG. 4 is a plan view of the cover assembly that forms, in conjunction with the main element, the fuel manifolds.

FIG. 5 is a perspective view of a detail.

FIG. 6 is a view of a rocket showing the injector head in position.

Figure 1:
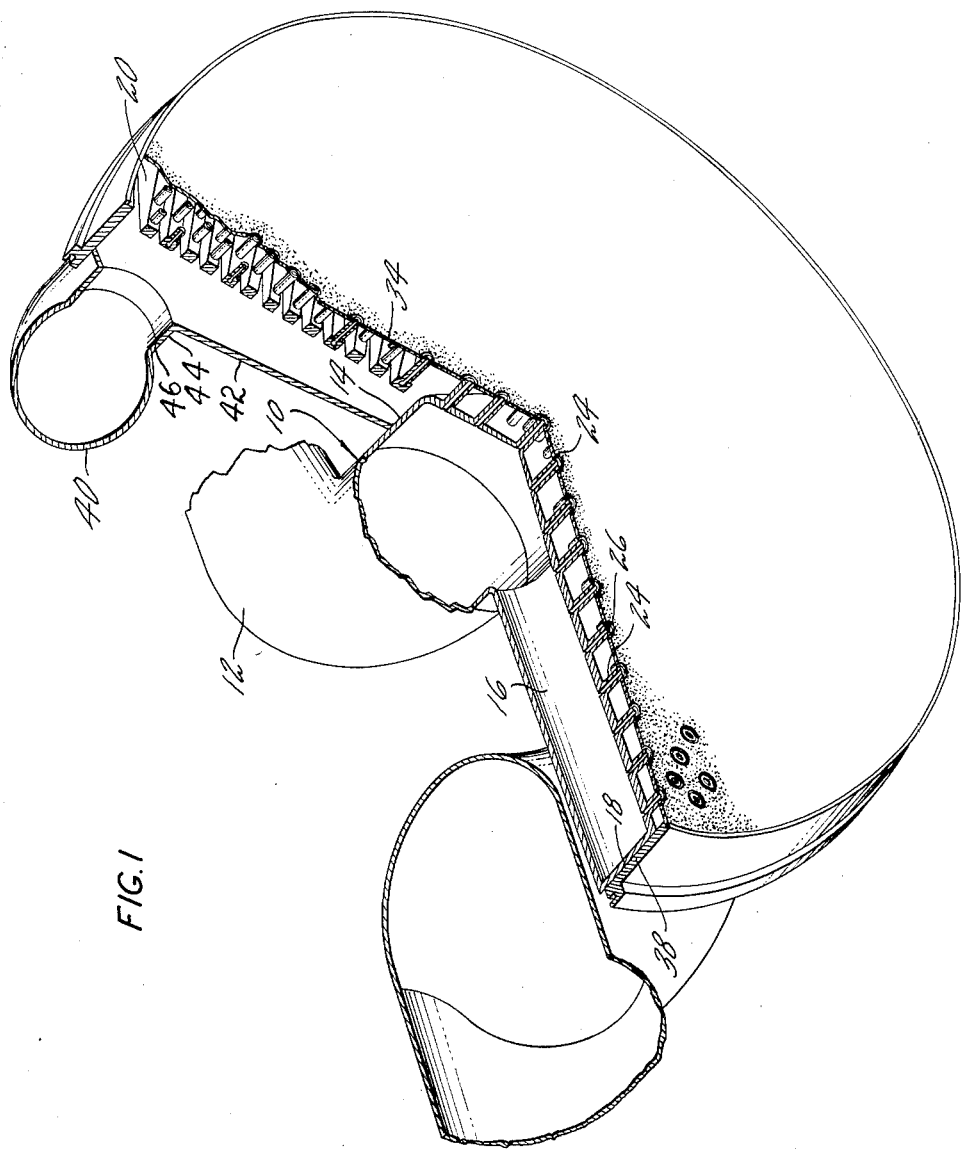
FIG. 1 is a perspective view of the injector head with parts broken away.

The invention is shown in connection with a rocket having a combustion chamber 2. The combustion chamber has a side wall 4 and a head 6 forming the closed end on the chamber. The chamber discharges through a nozzle 8, the wall of which is a continuation of wall 4. The head 6 forms an injector head through which the propellants are delivered into the combustion chamber and is so constructed that the fuel flow into the combustion chamber is arranged concentrically around a multitude of orifices through which the oxidizer is discharged. The injector head includes a basic structural member 10, FIG. 1, having an inlet connection 12 into a central chamber or hollow hub 14. Extending outwardly from and communicating with the central chamber 14 are spokes 16 integral with the hub, the outer ends of these spokes being closed by integral end caps 18 at the periphery of the injector head. The spokes carry a plurality of concentric annular rings 20, FIGS. 2 and 3, integral with the spokes. The rings 20 are radially spaced apart to define passages 22 therebetween for a flow of hydrogen or fuel, as will hereinafter appear.

Each of the rings 20 has a plurality of integral projecting tube elements 24 through each of which is a passage 26 for the discharge of the oxidizer into the combustion chamber. The passages 26 communicate with the radial spokes 16 by drilled passages 28 in the rings 20 which intersect the passages 26. To permit drilling of these passages, each of the spokes 16 which is hollow, as shown, is split transversely into a bottom portion 16a with which the rings 20 are integral and a top portion 16b which is welded to the bottom portion 16a after the passages 28 have all been formed.

In the manufacture of the tube elements 24, the rings 20 may be grooved circumferentially as at 32, FIG. 5, and the tubes 24 may then be formed by hollow milling.

Figure 2:
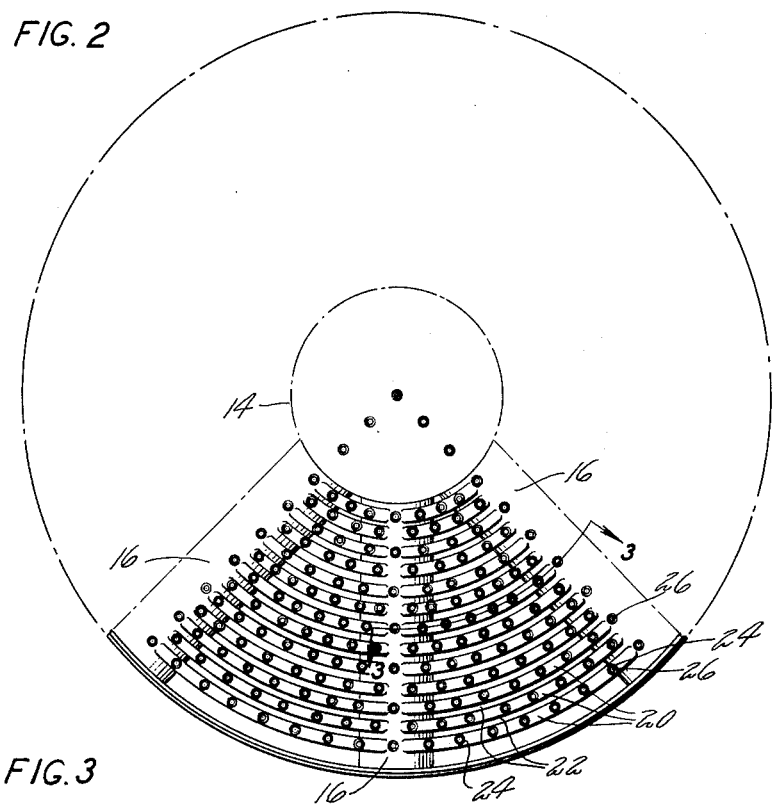
FIG. 2 is a plan view looking at the bottom of the oxidizer manifold.

A porous rigid plate 34, FIG. 1, is mounted on the tips of the tube elements 24 having openings 36 therein in which the tips of the tube elements are mounted. The openings 36 are larger than the tube elements to form annular passages 37 around each tube to permit the flow of fuel therethrough and into the combustion chamber in concentric relation to the oxidizer flowing through the tubes. The plate 34, FIG. 1, is supported by a cylinder 38 surrounding the oxidizer manifold as well as locally by rings 20, FIG. 3, by means of spuds 39 machined into rings 20. The cylinder is brazed or welded to the end caps 18. This cylinder or ring 38 also forms the attachment means between the injector head and the rocket wall 4.

A fuel manifold 40, FIG. 4, in the form of a ring manifold adjacent to the periphery of the injector head is arranged to rest on the top sides of the spokes 16. Between the spokes 16 are sector-shaped elements 42 which are brazed or welded to the spokes 16 below the braze attachment of the parts 16a to the parts 16b. These elements 42 are also attached at the periphery of the injector head to the cylinder 38. The spaces formed between the spokes by the sector elements 42 communicate with the manifold 40 through interconnected openings 44 in the sector elements and openings 46 in the ring manifold.

In assembly, the main member 10 having been machined, the cylinder 38 is mounted on the member 10 and the plate 34 is brazed in position. The fuel manifold is then mounted in position and the sector-shaped pieces are brazed or welded to the spokes and to the ring 38. The parts 16b of the spokes are then brazed or welded to the remainder of the spokes and the inlet 12 is brazed or welded in position.

With this arrangement, there are no brazed or weld joints between the chamber for the oxidizer and the chamber for the fuel (hydrogen). Any leakage of either propellant will escape into the atmosphere where it will not form an explosive mixture and where it will not be confined. The member 10, by reason of its construction, is relatively rugged and will withstand the loading thereon when the rocket is in operation. The manifold for the hydrogen, the sector-shaped elements, increase the rigidity of the injector head and the result is an extremely strong device with a minimum weight.

Figure 3:
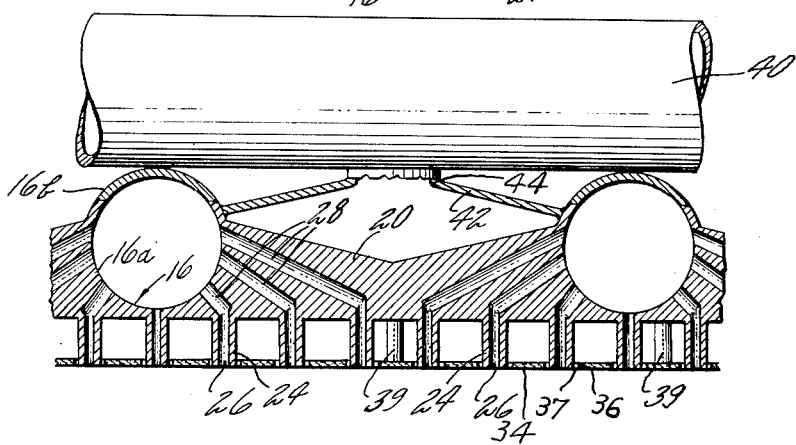
FIG. 3 is a fragmentary sectional view substantially along the line 3—3 of FIG. 2 with the bottom plate shown in position.

The oxidizer being supplied through the inlet 12 passes radially from the hub into the spokes and thence into the injector tubes 24. As shown in FIGS. 1 and 3, some of these tubes are located directly on the hub and others extend directly from the spokes so that the result is a substantially uniform distribution of these tubes over the face of the injector.

It is to be understood that the invention is not limited to the specific embodiment herein illustrated and described, but may be used in other ways without departure from its spirit as defined by the following claims.

I claim:

1. An injector head for a rocket combustion chamber for the delivery of two propellants into the chamber, said head including a central hollow hub receiving one propellant and having substantially radially extending manifolds integral therewith and projecting therefrom, each manifold having a plurality of propellant discharge tubes extending therefrom, a plate having a plurality of openings to receive the ends of the tubes and spaced axially from said radial manifolds, an annular manifold for the other propellant surrounding said hub and located adjacent to the ends of the radially extending manifolds, and a plurality of sector-shaped fillers engaging and closing the spaces between the radially extending manifolds to define chambers into which the other propellant is discharged from said annular manifold.

2. An injector head as in claim 1 in which a plurality of concentric rings are provided integral with said radially extending manifolds, said rings having propellant discharge tubes thereon.

3. An injector head as in claim 2 in which said rings have passages therein connecting said tubes to said radial manifolds.

4. An injector head as in claim 1 in which a ring extends around the ends of said radial manifolds and the sector-shaped fillers are attached to the radial manifolds and to said ring.

5. An injector head as in claim 1 in which the annular manifold communicates with the chambers between the spokes through interconnecting openings in said sector-shaped fillers and the annular manifold.

6. An injector head for a rocket including a hollow hub having integral hollow spokes extending therefrom substantially in a radial plane, each spoke having an integral end closure and each spoke being open along one side, a plurality of concentric rings radially spaced from one another and integral with said spokes, a plurality of tubes integral with and extending axially from said rings, said rings having passages for fluid flow from the spokes to the tubes, a plurality of sector-shaped elements positioned between adjacent spokes and brazed or welded thereto on the side of the rings remote from the tubes and in axially spaced relation to said rings to form chambers between said spokes communicating with the spaces between the rings and an annular manifold surrounding said hub and communicating with the chambers.

7. An injector head as in claim 6 in which the open sides of said spokes are closed by closure means brazed or welded to the spokes.

8. An injector head as in claim 6 in which a ring surrounds the spokes in engagement with the end closures with the sector-shaped elements brazed or welded to said ring.

9. An injector head as in claim 6 in which a plate having openings therein to receive the tubes is positioned on said tubes in substantial alignment with the ends of said tubes.

10. An injector head as in claim 9 in which a ring surrounds said spokes in engagement with the ends thereof and supports the plate positioned on the ends of the tubes.

11. An injector head for a rocket combustion chamber, said head including a structurally rigid base member having a hollow hub and integral hollow spokes extending outwardly therefrom all in substantially the same plane, a plurality of rings integral with said spokes and arranged in concentric spaced relation to one another with one substantially radial surface of each of said rings all being in substantially a single radial plane, said spokes and said rings having propellant discharge tubes extending therefrom in an axial direction, said rings and spokes having fluid passages therein providing a fluid connection from said spokes to said tubes, said hub, spokes and rings constituting the base member and the manifold for one propellant and an annular duct surrounding said hub and having elements thereon attached to said base plate to define between adjacent spokes, a chamber for a second propellant, said chamber communicating with the spaces between adjacent rings and an injection plate mounted on said tubes at their ends, said plate having openings to receive the tubes.

12. An injector head as in claim 11 in which the openings in the injection plate are larger than the tubes to form annular passages for the propellant concentric to the tubes.

13. An injector head as in claim 11 in which a ring surrounds the spokes in engagement with the outer ends thereof and in which the injection plate is supported by said ring.

14. An injector head as in claim 11 in which the annular duct and said elements have intercommunicating openings for the flow of propellant from said annular duct into the chambers between the spokes.

References Cited by the Examiner

UNITED STATES PATENTS

| | | | |
|---|---|---|---|
| 2,703,962 | 3/1955 | Olson | 60—39.74 |
| 2,928,236 | 3/1960 | Kircher et al. | 60—35.6 |
| 2,929,208 | 3/1960 | Schultz | 60—35.6 X |

MARK NEWMAN, *Primary Examiner.*

SAMUEL FEINBERG, *Examiner.*